United States Patent
Znamenskiy et al.

(10) Patent No.: US 10,885,392 B2
(45) Date of Patent: Jan. 5, 2021

(54) LEARNING ANNOTATION OF OBJECTS IN IMAGE

(71) Applicant: KONINKLIJKE PHILIPS N.V., Eindhoven (NL)

(72) Inventors: Dmitry Nikolayevich Znamenskiy, Eindhoven (NL); Kamana Sigdel, Eindhoven (NL); Marc Van Driel, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 23 days.

(21) Appl. No.: 16/467,005

(22) PCT Filed: Dec. 5, 2017

(86) PCT No.: PCT/EP2017/081585
§ 371 (c)(1),
(2) Date: Jun. 5, 2019

(87) PCT Pub. No.: WO2018/104342
PCT Pub. Date: Jun. 14, 2018

(65) Prior Publication Data
US 2019/0347524 A1    Nov. 14, 2019

(30) Foreign Application Priority Data
Dec. 8, 2016 (EP) .................................... 16202827

(51) Int. Cl.
*G06K 9/62* (2006.01)
*G06K 9/72* (2006.01)

(52) U.S. Cl.
CPC ......... *G06K 9/6263* (2013.01); *G06K 9/6253* (2013.01); *G06K 9/6257* (2013.01);
(Continued)

(58) Field of Classification Search
CPC ........... G06K 2209/05; G06K 9/00147; G06K 9/6261; G06K 9/6263; G06T 2207/20016;
(Continued)

(56) References Cited

U.S. PATENT DOCUMENTS

2005/0010553 A1\* 1/2005 Liu ........................ G06F 16/583
2006/0127880 A1\* 6/2006 Harris ................. G06K 9/00127
435/4

(Continued)

FOREIGN PATENT DOCUMENTS

| CN | 102156752 A | 8/2011 |
|---|---|---|
| CN | 104537676 A | 4/2015 |
| EP | 2854100 A1 | 4/2015 |

OTHER PUBLICATIONS

PCT International Search Report, International application No. PCT/EP2017/081585, dated Feb. 27, 2018.
(Continued)

*Primary Examiner* — David Bilodeau
(74) *Attorney, Agent, or Firm* — Sherry Austin (57) ABSTRACT

A system and method are provided which use a machine learning algorithm to obtain a learned annotation of objects in one or more scales of a multiscale image. A viewing window (300) is provided for viewing the multiscale image. The viewing window is configurable on the basis of a magnification factor, which selects one of the plurality of scales for viewing, and a spatial offset parameter. A user may provide a manual annotation of an object in the viewing window, which is then used as training feedback in the learning of the machine learning algorithm. To enable the user to more effectively provide the manual annotation, the magnification factor and the spatial offset parameter for the viewing window may be automatically determined, namely by the system and method determining where in the multiscale image the manual annotation of the object would have
(Continued)

sufficient influence on the learned annotation provided by the machine learning algorithm. The determined influence may be shown in the form of an overlay (350) in the viewing window.

20 Claims, 4 Drawing Sheets

(52) U.S. Cl.
CPC .......... *G06K 9/6261* (2013.01); *G06K 9/726* (2013.01); *G06K 2209/05* (2013.01)

(58) Field of Classification Search
CPC . G06T 2207/20021; G06T 2207/20081; G06T 2207/20084; G06T 2207/30024; G06T 7/11; G06T 7/194
See application file for complete search history.

(56) References Cited

U.S. PATENT DOCUMENTS

| | | | | |
|---|---|---|---|---|
| 2010/0098306 A1* | 4/2010 | Madabhushi | ......... | G06T 7/0012 |
| | | | | 382/128 |
| 2014/0219548 A1* | 8/2014 | Wels | ...................... | A61B 6/025 |
| | | | | 382/154 |
| 2014/0233826 A1* | 8/2014 | Agaian | .................. | G16H 30/20 |
| | | | | 382/133 |
| 2014/0270432 A1 | 9/2014 | Xu | | |
| 2016/0171682 A1* | 6/2016 | Abedini | ............. | G06K 9/00147 |
| | | | | 382/132 |
| 2017/0193009 A1* | 7/2017 | Rapantzikos | ......... | G06F 16/335 |

OTHER PUBLICATIONS

Mostajabi M. et al., "Feedforward Semantic Segmentation with Zoom-Out Features", 2015 IEEE Conference on Computer Vision and Pattern Recognition (CVPR), Computer Vision Foundation, pp. 3376-3385, Jun. 7-12, 2015.

Batra et al., "Interactively Co-segmentating Topically Related Images with Intelligent Scribble Guidance", Int J Comput Vis, 2011, vol. 93, No. 3, Jan. 7, 2011 (Jan. 7, 2011), pp. 273-292, XP019894571.

Fares Al-Qunaieer et al: "Automated Resolution Selection for Image Segmentation", arxiv.org, Cornell University Library, 201 Olin Library Cornell University Ithaca, NY 14853, May 22, 2016 (May 22, 2016), XP080702802.

Hu Jiagao et al., "Progressive Image Segmentation Using Online Learning", Nov. 22, 2015 (Nov. 22, 2015), Network and Parallel Computing; [Lecture Notes in Computer Science; Lect.Notes Computer], Springer International Publishing, Cham, p. 181-191, XP047328142.

* cited by examiner

LEARNING ANNOTATION OF OBJECTS IN IMAGE

CROSS-REFERENCE TO RELATED APPLICATIONS

This application claims the priority benefit under 35 U.S.C. § 371 of international patent application no. PCT/EP2017/081585, filed Dec. 5, 2017, which claims the benefit of European Patent Application No. EP16202827.8, filed on Dec. 8, 2016. These applications are hereby incorporated by reference herein in their entirety.

FIELD OF THE INVENTION

The invention relates to a system and a computer-implemented method for learning annotation of objects in an image. The invention further relates to a workstation and imaging apparatus comprising the system, and to a computer readable medium comprising instructions for causing a processor system to perform the method.

BACKGROUND OF THE INVENTION

In digital pathology, it is known to perform automatic cell or tissue type detection using computer vision algorithms, and in particular, using machine learning algorithms. The training of such machine learning algorithms requires manual tissue or cell annotation. However, the manual annotation of pathology images to characterize different types of tissues or cells is a time consuming job. A reliable annotation requires a pathologist, which makes it an expensive process. In addition, the manual annotation of a pathology image is tedious work and can be an error prone task even for a trained pathologist.

The above problems also occur in domains other than digital pathology. It is thus desirable to reduce the effort for a user to train a machine learning algorithm.

CN104537676 describes a gradual image segmentation method based on online learning. It is said that the gradual image segmentation method comprises the steps that multi-layer decomposition is carried out on an input image, and multi-layer expression of the image is obtained; interactive segmentation is carried out, on the basis of user labels, a segmentation model is trained and updated, and an image is accurately segmented gradually through iterative loops; in the interactive segmentation process, a part of an area which is mistakenly segmented is corrected through the user labels, a training sample is extracted from the user labels, and the sample is expanded through the sample expansion strategy; the training sample obtained through expansion is utilized for training and updating a segmentation model, segmentation prediction is carried out on the input image.

CN104537676 thus describes a method in which, rather than having a user manually annotate a large amount of images before training, a segmentation model is trained and updated in an interactive manner, namely by the user correcting the segmentation results during the segmentation process. The training is thus performed gradually.

Disadvantageously, it may still require a substantial amount of effort of a user to correct all of the erroneous segmentation results of CN104537676.

A publication titled "*Interactively Co-segmentating Topically Related Images with Intelligent Scribble Guidance*" by Dhruv Batra et al., Int J Comput Vis, 2011, vol. 93, no. 3, describes an algorithm for interactive co-segmentation of a foreground object from a group of related images. An automatic recommendation system is described that is said to intelligently recommend where the user should scribble next. Given a set of initial scribbles from the user, a recommendation map is computed for each image in the group. The image (and region) with the highest recommendation score is presented to the user to receive more scribbles. As recommendation score, a number of 'cues' are combined.

SUMMARY OF THE INVENTION

It would be advantageous to obtain a system and method which allows a user to more selectively provide feedback for the training of a machine learning algorithm.

A first aspect of the invention provides a system for learning an annotation of objects in an image, the system comprising:

an image data interface configured to access image data representing a multiscale representation of an image, the multiscale representation of the image comprising a plurality of scales representing the image at different spatial resolutions;

a memory comprising instruction data representing a set of instructions;

a processor configured to communicate with the image data interface and the memory and to execute the set of instructions, wherein the set of instructions, when executed by the processor, cause the processor to use a machine learning algorithm to obtain a learned annotation of objects in one or more scales of said multiscale image; and a user interface subsystem comprising:

i) a display processor configured to establish a viewing window on a display for viewing the multiscale image, the viewing window being configurable on the basis of a magnification factor which determines which one of the plurality of scales is to be shown in the viewing window and a spatial offset parameter which defines which part of said scale is to be shown; and ii) a user input interface configured to receive user input data which is indicative of a manual annotation of an object in the viewing window by a user;

wherein the set of instructions, when executed by the processor, cause the processor to:

use the manual annotation of the object by the user as learning input in the machine learning algorithm; and before receiving the user input data, determine the magnification factor and the spatial offset parameter for the viewing window by identifying where in the multiscale image the manual annotation of the object by the user yields a change in the learned annotation of objects by the machine learning algorithm which satisfies a change criterion.

A further aspect of the invention provides a workstation or imaging apparatus comprising the system.

A further aspect of the invention provides a computer-implemented method for learning an annotation of objects in an image, the method comprising:

accessing image data representing a multiscale representation of an image, the multiscale representation of the image comprising a plurality of scales representing the image at different spatial resolutions;

using a machine learning algorithm to obtain a learned annotation of objects in one or more scales of said multiscale image;

establishing a viewing window on a display for viewing the multiscale image, the viewing window being configurable on the basis of a magnification factor which determines which one of the plurality of scales is to be shown in the viewing window and a spatial offset parameter which defines which part of said scale is to be shown; and receiving user input data which is indicative of a manual annotation of an object in the viewing window by a user;

wherein the method further comprises:

using the manual annotation of the object by the user as training feedback in the learning of the machine learning algorithm; and before receiving the user input data, determining the magnification factor and the spatial offset parameter for the viewing window by identifying where in the multiscale image the manual annotation of the object by the user yields a change in the learned annotation of objects by the machine learning algorithm which satisfies a change criterion.

A further aspect of the invention provides a computer readable medium comprising transitory or non-transitory data representing instructions arranged to cause a processor system to perform the method.

The above measures involve annotation of a multiscale representation of an image. Such multiscale representations are known per se. A non-limiting example is a pyramid representation of an image. For example, in digital pathology, images are typically stored as a multiresolution image pyramid where the nth image level has 2× lower resolution compared to (n-1)th image level. Another non-limiting example is a scale-space representation of an image. In general, such multiscale representations comprise or provide a plurality of scales representing a same image content at different spatial detail levels.

The above measures further enable a user to view the multiscale image in a viewing window on a display. The viewing window is configurable by a magnification factor which determines which one of the plurality of image scales is shown. As typically the selected image scale is larger than the viewing window, the viewing window has one or more configurable spatial offset parameters, e.g., a horizontal and vertical offset. Such spatial offsets may allow panning of the image content in the viewing window. It is noted that the functionality as described in this paragraph is known per se, e.g., from medical workstations.

The above measures further involve using a machine learning algorithm to provide an annotation of objects in one or more scales of said multiscale image. A non-limiting example of such a machine learning algorithm is a reinforcement learning algorithm or a convolutional neural network. The obtained annotation(s) are also referred to as 'learned annotations'. The machine learning algorithm further uses a manual annotation of the object by the user as training feedback. The manual annotation may be provided by the user using the viewing window, e.g., by drawing a contour in the viewing window, or in any other manner known per se in the field of image annotation. The manual annotation may also involve a correction of a learned annotation. For example, the manual annotation may involve the user correcting a label of an annotated object. In a specific example, the manual annotation may be used as training feedback in a same or similar manner as CN104537676. In this respect, is noted that annotation may comprise segmentation or delineation, but may also may comprise assigning or changing a label to or of an already segmented object.

The above measures further involve automatically determining the magnification factor and the spatial offset parameter for the viewing window. Namely, the measures identify where in the multiscale image the manual annotation of an object by the user would yield sufficient change in the learned annotation of objects in the multiscale image by the machine learning algorithm. Here, the term 'where' may refer to an image scale and a spatial position within the image scale. By identifying the image scale, the magnification factor for the viewing window may be identified. By identifying the spatial position in the image scale, the spatial offset parameter for the viewing window may be determined. The viewing window may then be automatically configured with the magnification factor and spatial offset parameter. Alternatively, the magnification factor and spatial offset parameter may be indicated to the user, e.g., in the form of a graphical indicator or text, to enable the user to manually configure the viewing window accordingly.

The above measures have as effect that the user is directed towards a position in the multiscale image in which his/her feedback is deemed to sufficiently change the learned annotation of objects in the multiscale image by the machine learning algorithm. Here, the term 'sufficiently change' is to be technically understood as the change satisfying a change criterion. For example, the change criterion may be an absolute or relative threshold. Another example is that the change criterion may identify a maximum obtainable change. It will be appreciated that such change may be quantified by various metrics. A non-limiting example is that a metric may determine a difference between learned annotations before and after using the manual annotation as training feedback. In a specific example, if the learned annotation yields a pixel-wise labeling, the differences in the pixel-wise labeling may be summed over all pixels of the multiscale image so as to obtain a quantification of the change.

By identifying where in the multiscale image the manual annotation of the object by the user would sufficiently change the overall learned annotation of objects by the machine learning algorithm, the user will be guided towards where his/her feedback provides a significant contribution. It will be appreciated that a manual annotation which, when used as training feedback, does not materially change the learned annotation may be considered superfluous. Such types of manual annotation may thus be avoided. Advantageously, a user may more selectively provide input during the training of a machine learning algorithm, in that manual annotations which have little effect on the learned annotation may be avoided.

It will be appreciated that within the field of the invention, 'simulating a manual annotation' will be understood as the annotation being 'automatically' performed, i.e., without involving the user. Such automatic annotation normally strives to simulate a human annotator, which follows nearly all learning-based automatic annotation techniques using manual annotations as training input, and ground truths/references being normally based on manual annotation. As such, the concept of 'simulating a manual annotation' denotes automatic annotation by the processor/method rather than by the user.

The set of instructions, when executed by the processor, may cause the processor to identify where in the multiscale image the manual annotation of the object by the user yields a maximum change, or a change exceeding an absolute or relative threshold, in the learned annotation of objects by the machine learning algorithm. The user may thus be guided towards where his/her feedback provides a maximum contribution to the training of the machine learning algorithm, or a sufficient contribution in that it exceeds a threshold.

For example, the set of instructions, when executed by the processor, may cause the processor to determine the magnification factor and the spatial offset parameter for the viewing window by:

simulating a manual annotation of an object in different scales and/or in different parts of each scale of the multiscale image;

using said simulated manual annotations as different learning input in the machine learning algorithm;

quantifying a change in the resulting different learned annotation of objects so as to identify a simulated manual annotation which provides the maximum change in the learned annotation of objects by the machine learning algorithm; and selecting the magnification factor and the spatial offset parameter for the viewing window on the basis of the identified simulated manual annotation.

The above measures involve simulating different manual annotations and quantifying for each of the simulated manual annotations the resulting change. This allows identifying a simulated manual annotation which provides a maximum change in the learned annotation of objects by the machine learning algorithm. By guiding the user towards the image scale and position in which the simulated manual annotation is located, the user may be guided towards where his/her feedback maximally contributes to the training of the machine learning algorithm. In this respect, it is noted that the simulated manual annotation may, and in fact is likely to, differ from the manual annotation of the user. For example, the simulated manual annotation may be coarse, e.g., involving assigning a label on a regional rather than local basis, etc. Nevertheless, the simulated manual annotation may allow identifying areas of maximum impact for subsequent manual annotation by the user.

Optionally, the set of instructions, when executed by the processor, cause the processor to:

divide each scale of the multiscale image into image parts; and simulate the manual annotation of the object by assigning an object label to, or changing a previously assigned object label, of at least one of the image parts.

The manual annotation may be simulated on a relatively coarse level, e.g., by quantifying the effect of a change in manual annotation on a per image part basis. For example, the image parts may be blocks, e.g., of 8×8 or 16×16 pixels. This may allow limiting the computational complexity of identifying where in the multiscale image the manual annotation of the object by the user yields the maximum change. Alternatively, the image parts may be automatically segmented objects, e.g., using a segmentation algorithm.

Optionally, the processor may be configured to generate a map of the degree of change effected by the manual annotation in each image part, and the user interface subsystem may be configured to overlay the map over the displayed multiscale image. For example, the degree of change may be visualized using a color coding in which the intensity, saturation or hue of the color is varied in accordance with the degree of change.

Optionally, the user interface subsystem is configured to automatically apply the magnification factor and the spatial offset parameter determined by the processor to the viewing window. The user is thus directly guided towards the image region to be annotated.

Optionally, the user interface subsystem is configured to enable the user to manually select the magnification factor and the spatial offset parameter for the viewing window during image viewing so as to determine a user-selected image region;

the set of instructions, when executed by the processor, cause the processor to use the machine learning algorithm to obtain a learned annotation of objects in the user-selected image region; and the user interface subsystem is configured to visualize the learned annotation of objects in the viewing window.

The user is thus provided with feedback on the learned annotations as provided by the machine learning algorithms. As such, the manual annotation by the user may take into account the current state of learned annotations in the multiscale image. In addition, if the manual annotation involves a correction of a learned annotation, the user may easily correct said learned annotation as it is visible to him/her in the viewing window. For the latter purpose, the user interface subsystem may optionally be configured to enable the user to manually correct the learned annotation of objects in the viewing window, and the set of instructions, when executed by the processor, may optionally cause the processor to use said corrected annotation as training feedback in the machine learning algorithm.

Optionally, the set of instructions, when executed by the processor, cause the processor to apply the machine learning algorithm to each scale of the multiscale image, thereby obtaining a plurality of annotation maps each representing the learned annotation of objects in the respective scale. Optionally, the set of instructions, when executed by the processor, cause the processor to generate a semantic description of the multiscale image by combining or superimposing the plurality of annotation maps. The simultaneous annotations on different scales may provide a semantic understanding of the multiscale image. For example, on a finer image scale, different cell types may be detected whereas on a coarser image scale, different tissue types may be detected. By combining or superimposing the plurality of annotation maps, a semantic description may be automatically generated, e.g., based on a ruleset which provides a semantic description for an image region as a function of the annotations in the same image region across the image scales.

It will be appreciated by those skilled in the art that two or more of the above-mentioned embodiments, implementations, and/or optional aspects of the invention may be combined in any way deemed useful.

Modifications and variations of the workstation, the imaging apparatus, the computer-implemented method, and/or the computer program product, which correspond to the described modifications and variations of the system, can be carried out by a person skilled in the art on the basis of the present description.

A person skilled in the art will appreciate that the system and method may be applied to image data acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). However, also non-medical uses are conceived. The image data may also be non-medical image data.

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS

The following list of reference numbers is provided for facilitating the interpretation of the drawings and shall not be construed as limiting the claims.

020 image repository
022 data communication
030 image data
060 display
062 display data
080 user input device
082 user input data
100 system for learning annotation of objects
120 image data interface
122 internal data communication
140 processor
142, 144 internal data communication
160 memory
180 user interface subsystem
182 display processor
184 user input interface
200 multiscale representation of image
202-208 image scales
210 tissue
220 cells
300 viewing window
310, 312 UI element for magnification factor
320, 322 UI element for horizontal offset
330, 332 UI element for vertical offset
350 overlay indicating image area of influence
400 method for learning annotation of objects
410 accessing image data
420 obtaining learned annotation of objects
430 establishing viewing window
440 identifying image area of influence
450 configuring viewing window
460 receiving manual annotation
470 using manual annotation as training feedback
500 computer readable medium
510 non-transitory data representing instructions

DETAILED DESCRIPTION OF EMBODIMENTS

Figure 1:
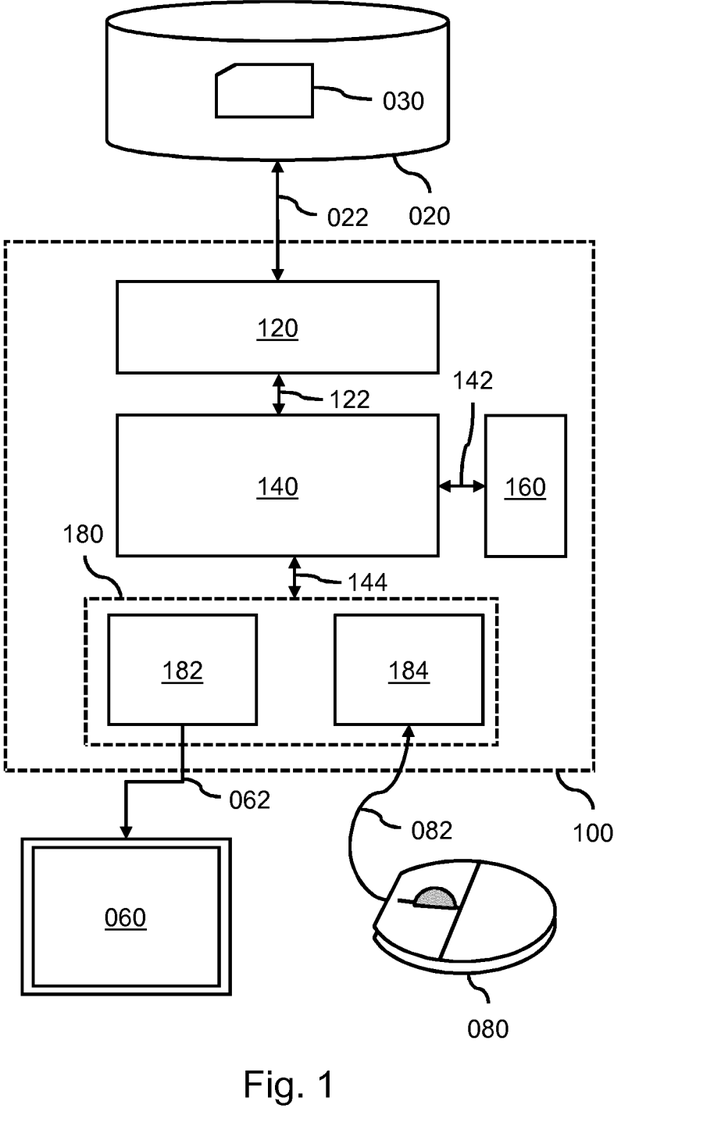
FIG. 1 shows a system for learning an annotation of objects.

FIG. 1 shows a system 100 for learning an annotation of objects in an image. The system 100 is shown to comprise an image data interface 120 configured to access, via data communication 022, image data 030 representing a multiscale representation of an image. The multiscale representation of the image may comprise a plurality of scales representing the image at different spatial resolutions. In the example of FIG. 1, the image data interface 120 is shown to be connected to an external image repository 020 which comprises the image data 030 of the multiscale image. For example, the image repository 020 may be constituted by, or be part of, a Picture Archiving and Communication System (PACS) of a Hospital Information System (HIS) to which the system 100 may be connected or comprised in. Accordingly, the system 100 may obtain access to the image data 030 of the multiscale image via the HIS. Alternatively, the image data 030 of the multiscale image may be accessed from an internal data storage of the system 100. In general, the image data interface 120 may take various forms, such as a network interface to a local or wide area network, e.g., the Internet, a storage interface to an internal or external data storage, etc.

The system 100 is further shown to comprise a processor 140 configured to internally communicate with the image data interface 120 via data communication 122, a memory 160 accessible by the processor 140 via data communication 142, and a user interface subsystem 180 with a display processor 182 and a user input interface 184 which is configured to internally communicate with the processor 140 via data communication 144.

The user interface subsystem 180 may be configured to, during operation of the system 100, enable a user to manually annotate an object in the multiscale image. For that purpose, the display processor 182 may be configured to generate display data 062 for a display 060 to establish a viewing window on the display 060 for viewing the multiscale image. For example, the viewing window may be part of a graphical user interface generated by the display processor 182. The user input interface 184 may be configured to receive user input data 082 from a user device 080 operable by the user to enable the user to indicate the manual annotation, and possibly in general to interact with the graphical user interface.

Although shown in FIG. 1 to be an external display, the display 060 may also be an internal display. The viewing window may be represented by a set of interface instructions stored as data in a memory accessible to the display processor 182, being for example the memory 160 or another memory of the system 100. The user input device 080 may take various forms, including but not limited to a computer mouse, touch screen, keyboard, microphone, etc. FIG. 1 shows the user input device to be a computer mouse 080. In general, the user input interface 184 may be of a type which corresponds to the type of user input device 080, i.e., it may be a thereto corresponding user device interface.

The processor 140 may be configured to, during operation of the system 100, use a machine learning algorithm to obtain a learned annotation of objects in one or more scales of said multiscale image. The machine learning algorithm may be represented by a set of instructions stored as data in the memory 160. Examples of machine learning algorithm include but are not limited to deep learning algorithms, e.g., convolutional neural networks. Such algorithms are known per se in the art of machine learning and computer vision.

Although not shown in FIG. 1, the viewing window established on the display may be configurable on the basis of a magnification factor which determines which one of the plurality of scales is to be shown in the viewing window and a spatial offset parameter which defines which part of said scale is to be shown in the viewing window. The processor 140 may be configured to, during operation of the system 100, determine the magnification factor and the spatial offset parameter for the viewing window by identifying where in the multiscale image the manual annotation of the object by the user yields a change in the learned annotation of objects by the machine learning algorithm which satisfies a change criterion. As such, the manual annotation may be performed in a desired area of the multiscale image as identified by the processor 140.

The operation of the system 100, including various optional aspects thereof, will be described further with reference to FIGS. 2-5.

In general, the system of FIG. 1 may be embodied as—or in—a device or apparatus, such as a workstation or imaging apparatus. The device or apparatus may comprise one or more (micro)processors which execute appropriate software. The processor and display processor of the system may each be embodied by one or more of these (micro) processors, or by a same (micro)processor. Software implementing, e.g., the machine learning algorithm, the viewing window or the graphical user interface comprising the viewing window and/or other functionality of the system, may have been downloaded and/or stored in a corresponding memory or memories, e.g., in volatile memory such as RAM or in non-volatile memory such as Flash. Alternatively, the processor and display processor of the system may be implemented in the device or apparatus in the form of programmable logic, e.g., as a Field-Programmable Gate Array (FPGA). The image data interface and user input interface may be implemented by respective interfaces of the device or apparatus. In general, each unit of the system may be implemented in the form of a circuit. It is noted that the system may also be implemented in a distributed manner, e.g., involving different devices or apparatuses. For example, the distribution of the system may be in accordance with a client-server model, e.g., using a server and a thin-client PACS workstation.

Figure 2:
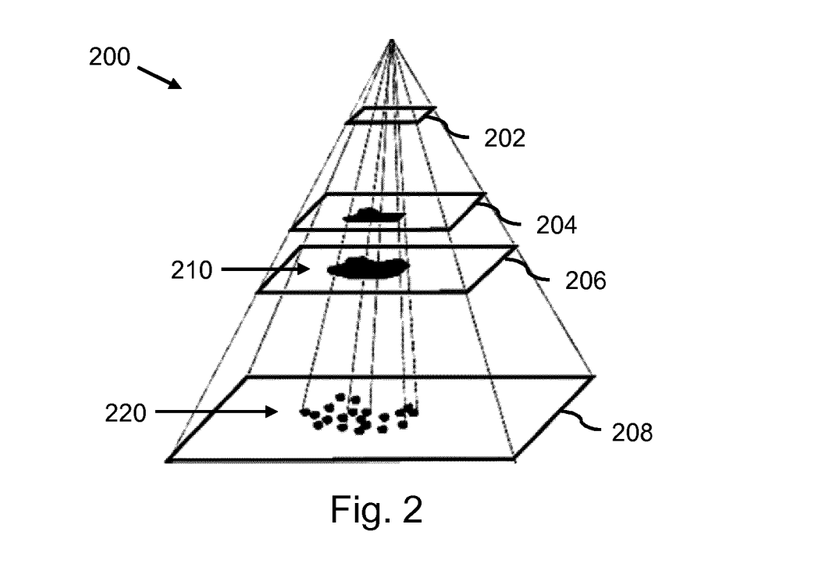
FIG. 2 shows a multiscale image in the form of an image pyramid.

FIG. 2 shows a multiscale image 200 in the form of an image pyramid, being an example of a multiscale representation of an image which may be used as input by the system 100 of FIG. 1. As can be seen in FIG. 2, the multiscale image 200 may be comprised of a number of image scales (FIG. 2 shows only a limited number of scales for reasons of clarity). By way of example, the multiscale image of FIG. 2 may be a digital pathology image. Such digital pathology images are typically stored as a multiresolution image pyramid where the nth image level has 2× lower resolution compared to (n-1)th image level. In the example of FIG. 2, the image scale "0" 208 may correspond to a "raw" pathology image, e.g., corresponding to the native imaging resolution, whereas the higher image scales, e.g., scale "5" 206, scale "6" 204 and scale "8" 202, may have a resolution which is reduced by a factor of 32, 64 and 256, respectively. It is noted that such scales may also be referred to as 'levels'.

For a user viewing a fixed-size portion of each image scale, e.g., a window of X by Y pixels, the image content and context may appear quite differently on each image scale. For example, the user may perceive individual cells 220 at the image scale "0" 208 while seeing micro-organs and different tissues 210 at image scale "5" 206 and up.

Figure 3:
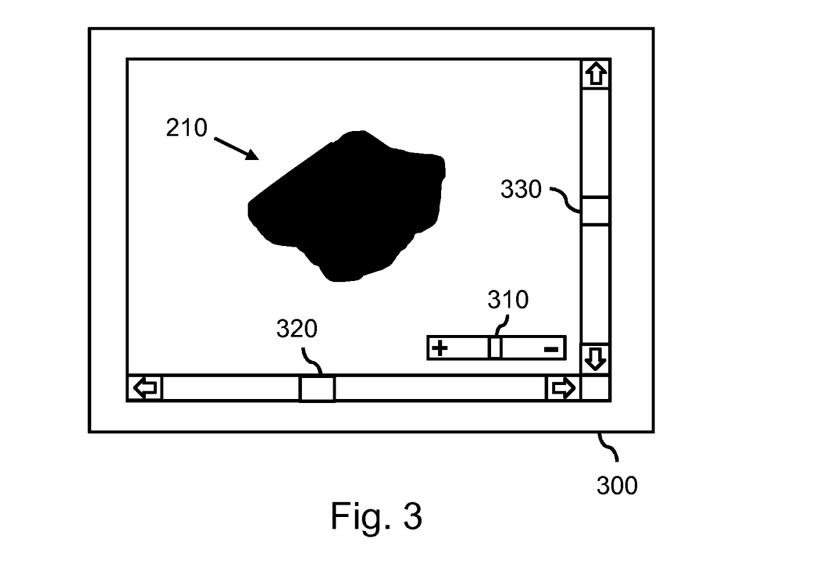
FIG. 3 shows a viewing window which may be established by the system on a display to enable a user to view the multiscale image.

FIG. 3 shows a viewing window 300 which may be established by the system on a display to enable a user to view the multiscale image. Such a viewing window 300 may display the aforementioned fixed-size portion of each selected image scale. In the example of FIG. 3, the viewing window is shown to display the multiscale image at an image scale showing tissue 210, e.g., at image scale 5 or 6. The user may use the viewing window to zoom-in or out of the multiscale image, thereby triggering the system to display another image scale. For that purpose, the user may use UI elements such as a slider 310 representing the magnification factor. Similarly, to pan through the selected image scale, the user may use UI elements such as sliders 320, 330 to select a horizontal and/or vertical spatial offset parameter and thereby to pan the image content within the viewing window.

As briefly described with reference to FIG. 1, the viewing window of FIG. 3 may be used by the user to provide training feedback, namely by manually annotating an object. For example, the user may delineate an object, assign an object label to an image part, or change an object label previously assigned by the machine learning algorithm.

It is known per se to use a viewing window as shown in FIG. 3 for the manual annotation of objects, such as cells and tissues. It will be appreciated, however, that in the example of a pathology image, cell function depends on the context. It is easier to discriminate the cell types when it is known in which tissue/organ the cell is located. Namely, a cell may be attributed to different cell types and functions depending on this context. The pathologist typically implicitly uses the image context on the different magnification levels to annotate/detect a specific tissue/cell type. Specifically, it may be easier to classify, as malicious or healthy, specific cell/tissue combinations, rather than to classify the individual cells out of their context. Moreover, it may be easier to annotate and classify, in a consistent manner, several cell/tissue types at the same time, employing differential classification.

From an annotation point of view, the context of the annotated/segmented object may be considered the plurality of all other objects visible within the particular viewing window and sampled at certain resolution. When the user zooms in/out, the context of the object may change both in quantity (e.g., number of visible objects) and quality (e.g., the pixel representation of the objects at certain resolution is different). For example, for the zoomed-in image, the context of a cell may be the plurality of neighboring cells, while for the zoomed-out image, the context may be the plurality of the surrounding tissues.

In a prior art manner of annotating multiscale images, the annotation of the image is usually done at a certain magnification factor where no information about the exact magnification value is retained. The magnification factor selected for the annotation may be a tradeoff between the annotation speed, accuracy and consistency. Thus, on high zoom factors, the annotation may be accurate, but slow and less consistent, as only the objects within the viewing window can be directly compared, and the context of the surrounding cell structures and tissues is beyond the boundaries of the viewing window. For the low zoom factors, the annotation is faster, but less accurate as the individual cells are barely visible.

Figure 4:
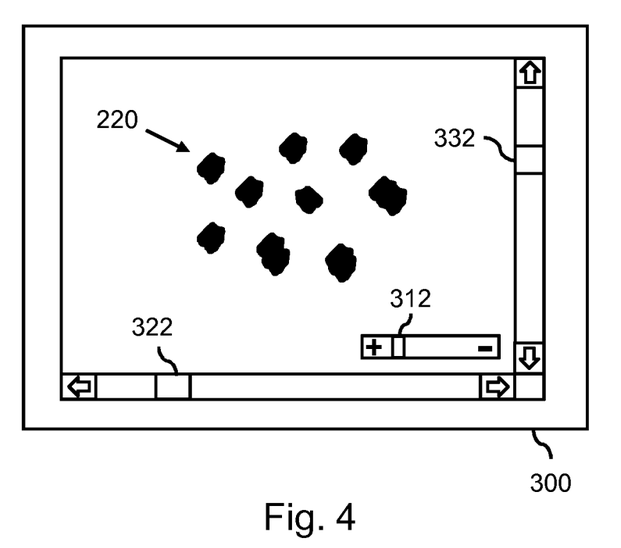
FIG. 4 shows the viewing window being automatically configured by the system to show an image area having a maximum influence on the learned annotation.

FIG. 4 shows a result of the system of FIG. 1 being configured to automatically show an image area having a maximum influence on the learned annotation. Namely, it can be seen that the viewing window 300 shows a different image scale, namely image scale "0" of FIG. 2 in which individual cells 220 are shown. In addition, horizontal and vertical spatial offset parameters may have been selected which show the particular image area of maximum influence. Here, the term 'image area of maximum influence' is understood as an image scale and image position in which the manual annotation by the user is deemed to maximally resolve the ambiguity of the learned annotation by the machine learning algorithm. The maximum influence may be calculated by determining a degree of change in the learned annotation in the multiscale image as a function of the image area to which the manual annotation is applied, and by selecting the image area associated with a largest change. Alternatively, the image area may also be identified based on the change in the learned annotation being substantial, e.g., by exceeding an absolute or relative threshold. As such, references to 'maximum influence' may also apply to a 'sufficient influence'.

To identify the image area of maximum influence, the processor of the system may be configured, by way of appropriate instructions, to determine the magnification factor and the spatial offset parameter for the viewing window, and thereby the image area, by quantifying a degree of change as a result of a simulated manual annotation. For example, the processor may simulate a manual annotation of an object in different scales and/or in different parts of each scale of the multiscale image, use said simulated manual annotations as different learning input in the machine learning algorithm, quantify a change in the resulting different learned annotation of objects so as to identify the simulated manual annotation which provides a maximum change in the learned annotation of objects by the machine learning algorithm, and selecting the magnification factor and the spatial offset parameter for the viewing window on the basis of the identified simulated manual annotation.

In another example, the system may carry out the following pseudo-code which may be performed iteratively by the system:

A. User or system selects magnification factor and spatial offset

B. For all image parts of the multiscale image do:
  a. Select a label
  b. Select a (unsupervised) segmentation method
  c. Use unsupervised algorithm to segment image part into clusters
  d. Edit segmentation map by assigning/erasing labels
  e. Update the machine learning algorithm
  f. Quantify change effected by above steps C. Search for magnification factor and spatial offset which provides an image part in which annotation by the user would maximally influence the automatic annotation maps; this may be selected by the system when reverting to step A. It is noted that steps a-b may be optional from the first re-computation of the annotation maps onwards.

Instead of segmenting the image content in clusters to simulate the manual annotation by the user, also a regular partitioning of the image content may be used. For example, the image content may be partitioned into blocks of which the label may be changed to simulate a manual annotation of the particular block by the user. In a specific example, the system may carry out the following pseudo-code which may be performed iteratively by the system. Firstly, the multiscale image may be divided into blocks of, e.g., 8×8 pixels. Then the 'influence' of each or a selection of blocks may be computed by:

a) Change label of block
  b) Consider block with changed label as manual annotation
  c) Update the machine learning algorithm
  d) Count number of pixels which are differently annotated; this number of pixels may be considered the 'influence' of the block.

It is noted that once a block or other image part has been identified, the magnification factor and spatial offset parameter(s) may be selected to show an image area which comprises the particular block or image part. For example, the magnification factor and spatial offset parameter(s) may center on the particular block or image part.

In general, the processor may divide each scale of the multiscale image into image parts by segmentation or partitioning, and simulate the manual annotation of the object by assigning an object label to, or changing a previously assigned object label, of at least one of the image parts. The influence of a particular image part may be computed as the size of the image part that would change label given that the particular image part would change label. Here, the term 'change label' may include a change in object type, such as cell type, but also includes any other kind of labelling which may be assigned during annotation.

Figure 5:
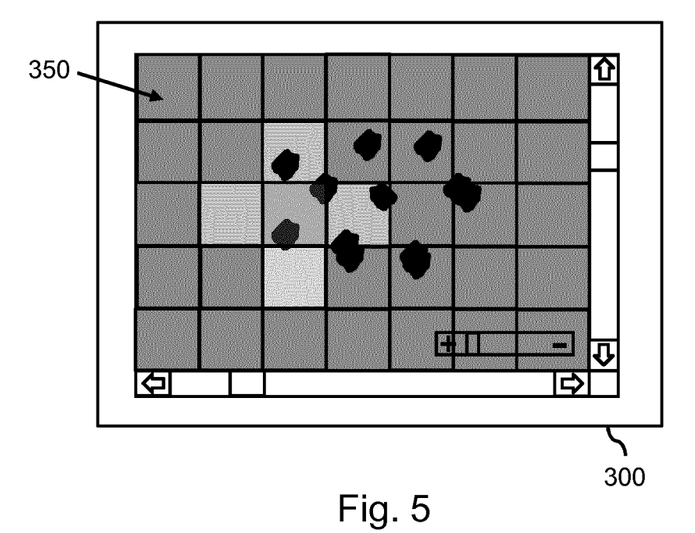
FIG. 5 shows the system providing an overlay over the image content in the viewing window to visually indicate the influence to the user.

FIG. 5 shows the system providing an overlay 350 over the image area shown in the viewing window to visually indicate the image part to the user. The overlay 350 may indicate where in the image area the manual annotation by the user is deemed to maximally influence the learned annotation. To generate the overlay 350, the system may make use of the influence of simulated manual annotations having been determined. The overlay 350 may be a transparent color overlay over the image scale, in which the transparency, intensity, hue, saturation or other visual property may be selected by the system proportional to the influence of the manual annotation in this image part. In the example of FIG. 5, darker shading indicates lesser influence, whereas brighter shading indicates higher influence.

In general, the annotation maps as obtained by the system at different magnification levels may be combined to provide a semantic description of the image context. The system may automatically create/refine the semantic description to be a) consistent with image annotation (e.g., the semantic description agrees with the manual annotations) b) consistent with the image content (e.g., similar pixels of the image content will be assigned similar semantic descriptions). For that purpose, the system may combine or superimpose annotation maps as obtained for each image scale. For example, if one annotation map on a finer resolution layer segments out individual cells, and another annotation map on a coarser resolution layer discriminates between the blued vessel and muscles tissue, then by combining these annotation maps one may identify 'vessel cells' and 'muscles cells'. A rule-based system, look-up table or similar technique may be used to obtain the sematic description. For example, the rule-based system may determine that, given a particular spatial position, if a cell has been identified at a finer resolution layer and muscle tissue at a coarser resolution layer, that the sematic description is 'muscle cell'.

It will be appreciated that the system may be advantageously used in the following specific context. During the image annotation process, while the pathologist is browsing and zooming the multiscale image, the system may automatically analyze the image content in the current viewing window to suggest automatic annotation map(s). The pathologist may review these annotation maps by rejecting wrongly erroneously classified labels (e.g., cells or tissues types). The pathologist may also provide a new annotation by specifying his/her own new segmentations or new labels. The annotation maps may be considered image scale (e.g., resolution level) specific and therefore defined to be visible only within a limited range of neighboring image scales. However, within the limited range of image scales, the annotation maps may be propagated to be visible there as well.

It will be further appreciated that the machine learning algorithm may be trained in parallel on each of the image scales. The machine learning algorithm may have a cost function which depends on the superposition of all manual annotation maps available at current image coordinate. The machine learning algorithm may be a deep learning algorithm.

Figure 6:
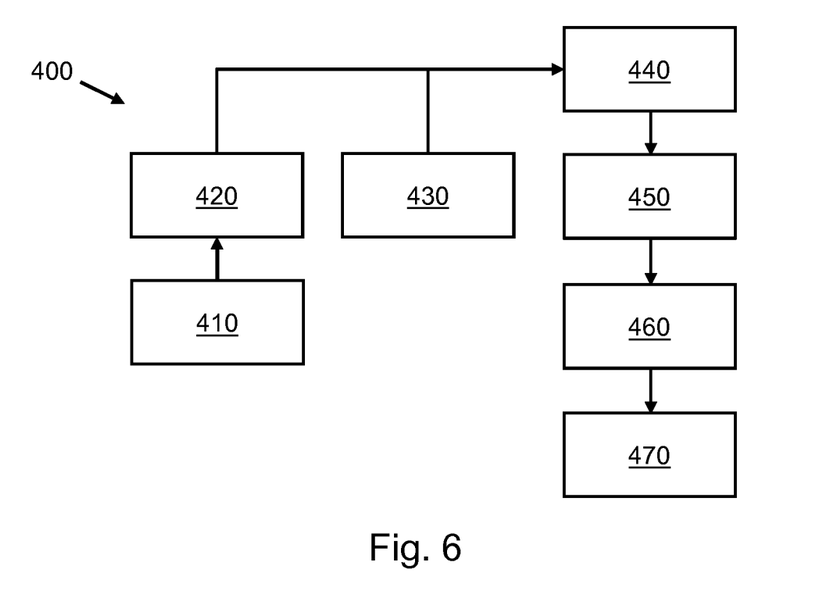
FIG. 6 shows a method for learning an annotation of objects.

FIG. 6 shows a computer-implemented method 400 for learning an annotation of objects in an image. It is noted that the method 400 may, but does not need to, correspond to an operation of the system 100 as described with reference to FIG. 1 and others.

The method 400 comprises, in an operation titled "ACCESSING IMAGE DATA", accessing 410 image data representing a multiscale representation of an image. The method 400 further comprises, in an operation titled "OBTAINING LEARNED ANNOTATION OF OBJECTS", using 420 a machine learning algorithm to obtain a learned annotation of objects in one or more scales of said multiscale image. The method 400 further comprises, in an operation titled "ESTABLISHING VIEWING WINDOW", establishing 430 a viewing window on a display for viewing the multiscale image. The method 400 further comprises, in an operation titled "IDENTIFYING IMAGE AREA OF INFLUENCE", identifying 440 where in the multiscale image the manual annotation of the object by the user yields a change in the learned annotation of objects by the machine learning algorithm which satisfies a change criterion. The method 400 further comprises, in an operation titled "CONFIGURING VIEWING WINDOW", determining 450 the magnification factor and the spatial offset parameter for the viewing window. The method 400 further comprises, in an operation titled "RECEIVING MANUAL ANNOTATION", receiving 460 user input data which is indicative of a manual annotation of an object in the viewing window by a user. The method 400 further comprises, in an operation titled "USING MANUAL ANNOTATION AS TRAINING FEEDBACK", using 470 the manual annotation of the object by the user as training feedback in the learning of the machine learning algorithm.

It will be appreciated that the above operation may be performed in any suitable order, e.g., consecutively, simultaneously, or a combination thereof, subject to, where applicable, a particular order being necessitated, e.g., by input/output relations.

Figure 7:
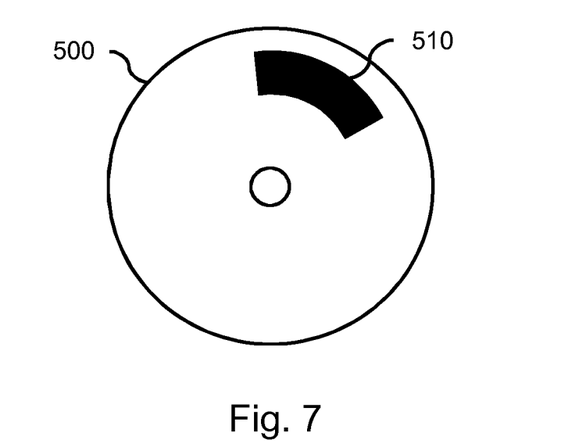
FIG. 7 shows a computer readable medium comprising instructions for causing a processor system to perform the method.

The method 400 may be implemented on a computer as a computer implemented method, as dedicated hardware, or as a combination of both. As also illustrated in FIG. 7, instructions for the computer, e.g., executable code, may be stored on a computer readable medium 500, e.g., in the form of a series 510 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 500.

Examples, embodiments or optional features, whether indicated as non-limiting or not, are not to be understood as limiting the invention as claimed.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for learning an annotation of objects in an image, the system comprising:
    an image data interface configured to access image data representing a multiscale representation of an image, the multiscale representation of the image comprising a plurality of scales representing the image at different spatial resolutions;
    a memory comprising instruction data representing a set of instructions;
    a processor configured to communicate with the image data interface and the memory and to execute the set of instructions, wherein the set of instructions, when executed by the processor, cause the processor to use a machine learning algorithm to obtain a learned annotation of objects in one or more scales of said multiscale image; and
    a user interface subsystem comprising:
    i) a display processor configured to establish a viewing window on a display for viewing the multiscale image, the viewing window being configurable on the basis of a magnification factor which determines which one of the plurality of scales is to be shown in the viewing window and a spatial offset parameter which defines which part of said scale is to be shown; and
    ii) a user input interface configured to receive user input data which is indicative of a manual annotation of an object in the viewing window by a user;
    wherein the set of instructions, when executed by the processor, cause the processor to:
        simulate a manual annotation of an object in different scales and/or in different parts of each scale of the multiscale image;
        use said simulated manual annotations as different learning input in the machine learning algorithm;
        quantify a change in the resulting different learned annotation of objects so as to identify a simulated manual annotation which provides the maximum change, or a change exceeding an absolute or relative threshold, in the learned annotation of objects by the machine learning algorithm;
        select the magnification factor and the spatial offset parameter for the viewing window on the basis of the identified simulated manual annotation; and
        after receiving the user input data, use the manual annotation of the object by the user as learning input in the machine learning algorithm.

2. The system according to claim 1, wherein the set of instructions, when executed by the processor, cause the processor to:
    divide each scale of the multiscale image into image parts; and
    simulate the manual annotation of the object by assigning an object label to, or changing a previously assigned object label, of at least one of the image parts.

3. The system according to claim 2, wherein the set of instructions, when executed by the processor, cause the processor to generate a map of a degree of change effected by the manual annotation in each image part, and wherein the user interface subsystem is configured to overlay the map in the viewing window.

4. The system according to claim 1, wherein the user interface subsystem is configured to automatically apply the magnification factor and the spatial offset parameter determined by the processor to the viewing window.

5. The system according to claim 1, wherein:
    the user interface subsystem is configured to enable the user to manually select the magnification factor and the spatial offset parameter for the viewing window during image viewing so as to determine a user-selected image region;
    the set of instructions, when executed by the processor, cause the processor to use the machine learning algorithm to obtain a learned annotation of objects in the user-selected image region; and
    the user interface subsystem is configured to visualize the learned annotation of objects in the viewing window.

6. The system according to claim 5, wherein:
    the user interface subsystem is configured to enable the user to manually correct the learned annotation of objects in the viewing window; and
    the set of instructions, when executed by the processor, cause the processor to use said corrected annotation as learning input in the machine learning algorithm.

7. The system according to claim 1, wherein the set of instructions, when executed by the processor, cause the processor to apply the machine learning algorithm to each scale of the multiscale image, thereby obtaining a plurality of annotation maps each representing the learned annotation of objects in the respective scale.

8. The system according to claim 7, wherein the set of instructions, when executed by the processor, cause the processor to generate a semantic description of the multiscale image by combining or superimposing the plurality of annotation maps.

9. The system according to claim 1, wherein the machine learning algorithm comprises a convolutional neural network.

10. A workstation comprising the system according to claim 1.

11. An imaging apparatus comprising the system according to claim 1.

12. A computer readable medium comprising or non-transitory data representing a machine learning algorithm trained using the system according to claim 1.

13. A computer-implemented method for learning an annotation of objects in an image, the method comprising:
    accessing image data representing a multiscale representation of an image, the multiscale representation of the image comprising a plurality of scales representing the image at different spatial resolutions;
    using a machine learning algorithm to obtain a learned annotation of objects in one or more scales of said multiscale image;
    establishing a viewing window on a display for viewing the multiscale image, the viewing window being configurable on the basis of a magnification factor which determines which one of the plurality of scales is to be shown in the viewing window and a spatial offset parameter which defines which part of said scale is to be shown; and
    receiving user input data which is indicative of a manual annotation of an object in the viewing window by a user;
wherein the method further comprises:
    simulating a manual annotation of an object in different scales and/or in different parts of each scale of the multiscale image;
    using said simulated manual annotations as different learning input in the machine learning algorithm;

quantifying a change in the resulting different learned annotation of objects so as to identify a simulated manual annotation which provides the maximum change, or a change exceeding an absolute or relative threshold, in the learned annotation of objects by the machine learning algorithm;

selecting the magnification factor and the spatial offset parameter for the viewing window on the basis of the identified simulated manual annotation; and after receiving the user input data, using the manual annotation of the object by the user as learning input in the machine learning algorithm.

14. The method according to claim 13, further comprising:

dividing each scale of the multiscale image into image parts; and simulating the manual annotation of the object by assigning an object label to, or changing a previously assigned object label, of at least one of the image parts.

15. The method according to claim 13, further comprising:

generating a map of a degree of change effected by the manual annotation in each image part, and overlaying the map in the viewing window.

16. The method according to claim 13, further comprising:

applying the magnification factor and the spatial offset parameter determined by the processor to the viewing window.

17. The method according to claim 13, further comprising:

applying the machine learning algorithm to each scale of the multiscale image, thereby obtaining a plurality of annotation maps each representing the learned annotation of objects in the respective scale.

18. The method according to claim 13, further comprising:

generating a semantic description of the multiscale image by combining or superimposing the plurality of annotation maps.

19. The method according to claim 13, wherein the machine learning algorithm comprises a convolutional neural network.

20. A computer readable medium comprising or non-transitory data representing instructions arranged to cause a processor system to perform the method according to claim 13.

* * * * *